(12) United States Patent
Gillett

(10) Patent No.: US 9,902,253 B2
(45) Date of Patent: Feb. 27, 2018

(54) YOKE MODULE SYSTEM FOR POWERING A MOTORIZED WHEEL

(71) Applicant: Carla R. Gillett, Sacramento, CA (US)

(72) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 0 days.

(21) Appl. No.: 15/269,842

(22) Filed: Sep. 19, 2016

(65) Prior Publication Data

US 2017/0106737 A1    Apr. 20, 2017

Related U.S. Application Data

(63) Continuation of application No. 13/872,054, filed on Apr. 26, 2013.

(51) Int. Cl.
*B60K 7/00* (2006.01)
*G05D 1/02* (2006.01)
*B60K 17/30* (2006.01)
*B60K 31/00* (2006.01)

(52) U.S. Cl.
CPC ............ *B60K 7/0007* (2013.01); *B60K 17/30* (2013.01); *B60K 31/0058* (2013.01); *G05D 1/0276* (2013.01); *B60K 2007/0038* (2013.01); *B60K 2007/0092* (2013.01)

(58) Field of Classification Search
CPC ............... B60K 7/007; B60K 17/30; B60K 2007/0038; B60K 2007/0092; B60K 7/0007; B60K 31/0058; G05D 1/0276
USPC ....................................................... 180/167
See application file for complete search history.

(56) References Cited

U.S. PATENT DOCUMENTS

| 3,163,250 | A | * | 12/1964 | Gibson | ................ B60K 17/046 180/253 |
| 3,720,281 | A | * | 3/1973 | Frownfelter | ............. B60K 1/00 180/167 |
| 3,827,517 | A | * | 8/1974 | Williamson | ........... B60K 17/10 180/21 |
| 4,776,415 | A | * | 10/1988 | Brice | ................... A47D 13/043 180/11 |
| 4,815,008 | A | * | 3/1989 | Kadonoff | ............. G05D 1/0234 180/169 |
| 4,816,998 | A | * | 3/1989 | Ahlbom | ............... G05D 1/0272 180/167 |
| 5,137,103 | A | * | 8/1992 | Cartmell | ................. B62B 3/001 180/13 |

(Continued)

*Primary Examiner* — John D Walters

(57) ABSTRACT

The yoke module is including wherein an elongated USB power cable, one or more yoke module sections accommodating access for the USB power cable and wire connectors to be threaded through one or more slotted openings and to exit out the top yoke module section, a first connection method to connect with the drive motor's lead cable harness directly to the USB power cable, a method to conceal and protect the drive motor's lead cable harness and the USB power cable by means of a coupling enclosure and yoke sleeve enclosure achieved through the yoke module's fabrication process. The yoke module also comprises a method for USB power cable to provide electricity power to drive a motorized wheel. The yoke module system comprises a second connection method for the yoke module to plug into auxiliary components including; a battery, a computer control system, and sensors for motion stability.

13 Claims, 5 Drawing Sheets

(56) References Cited

U.S. PATENT DOCUMENTS

| | | | | |
|---|---|---|---|---|
| 5,163,273 | A | * | 11/1992 | Wojtkowski ......... A01D 34/008 180/168 |
| 5,327,034 | A | * | 7/1994 | Couture ............... B60K 7/0007 310/64 |
| 7,047,712 | B1 | * | 5/2006 | Hunt .................... A01D 34/008 56/6 |
| 7,100,722 | B2 | * | 9/2006 | Bowen ................. B60K 7/0007 180/65.51 |
| 9,287,703 | B2 | * | 3/2016 | Wootton ................... H02J 1/08 |
| 2004/0112656 | A1 | * | 6/2004 | Bowen ................. B60K 7/0007 180/65.51 |

* cited by examiner

500 YOKE MODULE SYSTEM (1)

501. The yoke module comprising one or more yoke sections and access openings allowing the USB power cable and lead cable harness to be threaded there through.

502. A connection method comprising a process to connect the drive motor's lead cable harness to the USB power cable by means of a wire connector.

503. The yoke module comprising a method to directly couple to the hub motor's axis rods via connection points slotted on the bottom ends of the yoke's forked members.

504. The drive motor comprising an axle rod journaled therein, said axle passing through and rotatably mounting to the wheel.

505. The axle rods comprising a process to be attached at a point between said axle rod and at the end opening of the fork section.

506. The yoke module comprising a means for providing electricity to drive a motor device via a first connection method respectively to connect the drive motor's lead cable harness to the USB power cable.

507. A fabrication process comprising a pre-wiring method to connect said USB power cable to one or more drive motors.

508. The yoke module including a fabrication process comprised of plastic, polymers, carbon fiber, metal, or a combination thereof.

509. The yoke module system comprising a second connection method for the USB power cable to connect to an auxiliary contrivance.

510. The USB power cable to include a connection process for connecting sensors on a section of said yoke module.

511. The USB power cable to include a connection process for connecting to a controlled power source.

512. The USB power cable to include a connection process for connecting to a computer control system.

FIG. 5

YOKE MODULE SYSTEM FOR POWERING A MOTORIZED WHEEL

CROSS REFERENCED TO RELATED APPLICATIONS

A notice of issuance for a continuation in part patent application in reference to patent application Ser. No. 13/872,054, filing date: Apr. 26, 2013, title: "Robotic Omniwheel", and for referencing patent application Ser. No. 12/655,569, filing date: Jan. 4, 2010; and also referencing U.S. Pat. No. 8,430,192 B2, title: "Robotic Omniwheel Vehicle" In. Gillett.

STATEMENT REGARDING FEDERALLY SPONSORED RESEARCH & DEVELOPMENT

Non Applicable

THE NAMES OF PARTIES TO A JOINT RESEARCH AGREEMENT

Non Applicable

BACKGROUND OF THE INVENTION

1. Field of the Invention

This disclosure relates to a yoke module system for providing electrical current by means of a USB power cable to drive a motorized wheel.

2. Description of the Related Art

There are numerous vehicles in use today which have battery-powered electric motors to drive the wheels of the vehicle. These include skates and skateboards, bicycles, adult tricycles, wheel chairs, motor scooters, golf carts, all-terrain vehicles, etc. In many such vehicles, the motor is mounted to the vehicle frame with the motor output being coupled to the motorized wheels by way of a chain drive, gear train or the like.

There also exist in the prior art various vehicle which have an electric motor connected directly to a wheel hub and arranged to rotate that hub. In some cases, the motor is mounted outside the wheel hub and takes up considerable space. In other cases, the assembly is composed of a solid yoke the most serious disadvantage.

Prior motorized hub assemblies of this general types are providing a source of power to drive the motor of a motorized wheel however, none of these assemblies utilize a prewired yoke system to furnish power directly to the drive motor.

SUMMARY OF THE INVENTION

It is an object of the present invention to provide an improved yoke module. Accordingly, the purpose of the yoke module system is to provide electricity power to drive a motorized wheel, this is achieved by the process methods. An object of the present invention is to also provide an improved powering system to the motorized wheel's drive motor. Another object of the invention is to provide such a modular yoke assembly of any shape and dimension which is composed of a minimum number of separate parts which can be assembled as one unit without requiring any special tools or other equipment through the fabrication process.

A further option of the invention are to provide a yoke module system utilizing a conventional motorized wheel comprising a drive motor which is rotatably mounted on a hub assembly, and the yoke module to comprising an elongated USB power cable which is contained within the yoke module. Another object of the yoke module system in including a process means for accommodating access of said USB power cable to be threaded through the top and the bottom sections of said yoke module, and a means whereby the wheel's drive motor lead cable harness is contained within the yoke module. Additional processes and methods include: a process for the USB power cable to provide electricity power to drive a motorized wheel via a first connection method to connect the drive motor's lead cable harness to the USB power cable, and also include a second connection method for the yoke module to plug into auxiliary systems and contrivances including at least one of a computer control system, a sensor for motion stability and a power control system including a battery with a charging device. Ultimately the second connection method can be utilized a motion control system, and plug into gyroscopic balance sensors, accelerometers or MEMS for motion stability.

BRIEF DESCRIPTION OF THE DRAWINGS

These and other objects and advantages of the present invention a yoke module system will become more fully apparent from the following detailed description when read in conjunction with the accompany drawings with like reference numerals indicating corresponding parts throughout:

FIG. 5 shows a systematic flowchart 500 of the yoke module system 1.

DETAILED DESCRIPTION OF THE DRAWINGS

Figure 1A:
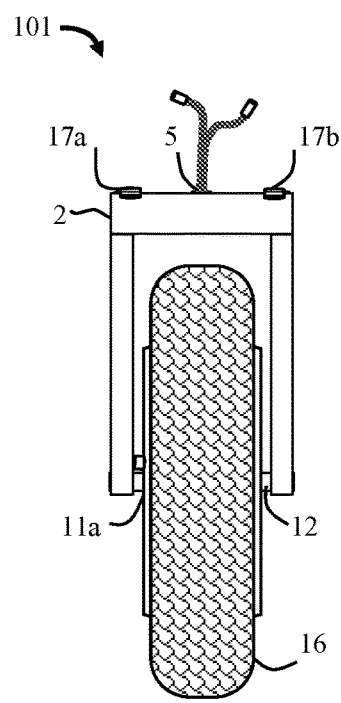
FIG. 1A shows a yoke module assembly of a fork member including one motorized wheel and FIG. 1B shows a narrow yoke module assembly including one motorized wheel.

These and other objects and advantages of the present invention will become more fully apparent from the following detailed description when read in conjunction with the accompany drawings with like reference numerals indicating corresponding parts throughout.

Primarily the purpose of the yoke module system is to provide electricity power to drive a motorized wheel, the is achieved by the following methods; a process for the motorized wheel is to include a drive motor which is rotatably mounted on a hub assembly, said drive motor is comprising a lead cable harness, said lead cable harness to be contained within the yoke module. The process for the USB power cable to provide electricity power to drive a motorized wheel via a first connection method to connect the drive motor's lead cable harness to the USB power cable, and include a second connection method for the yoke module to plug into auxiliary systems and contrivances including at least one of a computer control system, a sensor for motion stability and a power control system including a battery with a charging device.

The yoke module system 1 provides electricity power to drive a motorized wheel 8. As shown in FIG. 1-FIG. 4 the yoke module system 1 is comprising the following yoke fabrication processes 101-302 which include the following contrivances; a yoke module 2 of any shape and dimension, forming one complete section or forming multiple sections to be assembled.

Figure 1B:
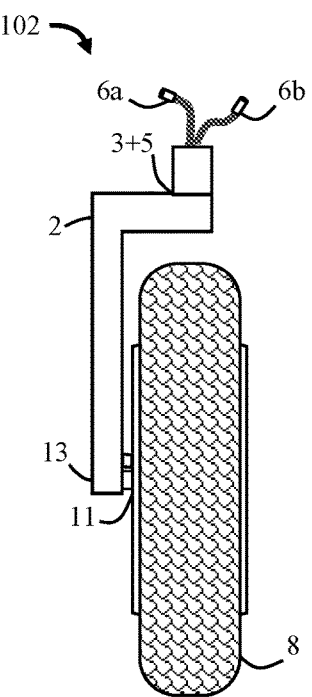
Figure 3A:
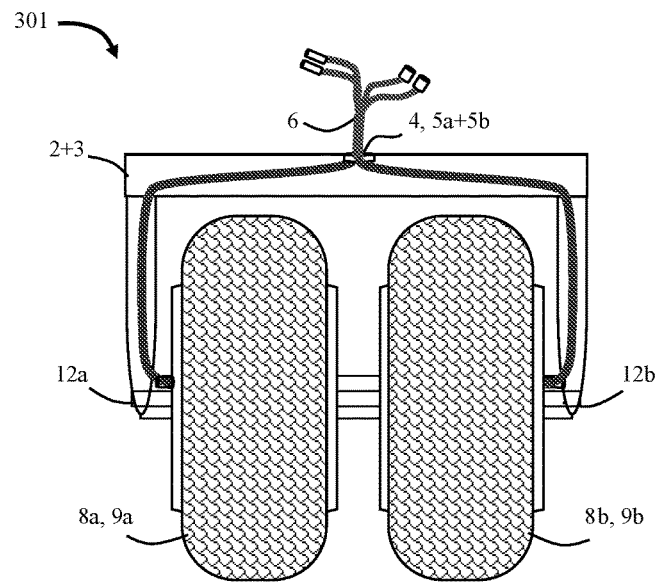
FIGS. 3A, 3B and 3BB, shows a yoke module assembly including a pair of synchronized motorized wheels.
Figure 3B:
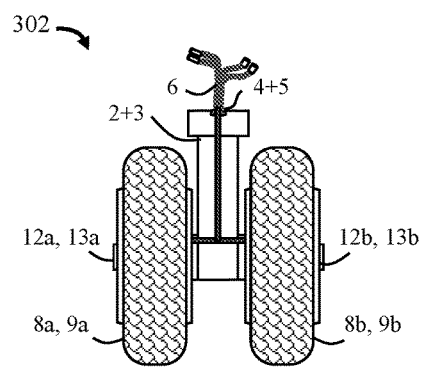
Figure 3B:
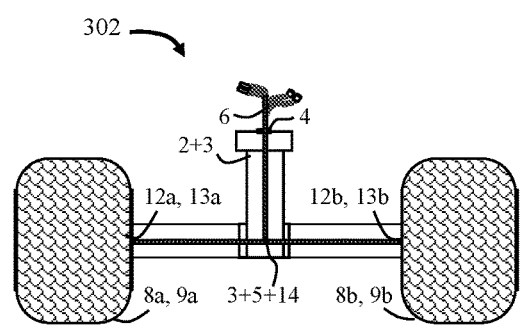

In further detail FIG. 1A illustrates the yoke module 2 is a forked shape 101 or as illustrated in FIG. 1B having cantilevered shape 102, respectively other shapes are depicted in FIG. 3. As shown, illustration number 101 the yoke module 2 is fabricated with three assembled yoke sections respectively, one top section and two side sections.

Figure 4:
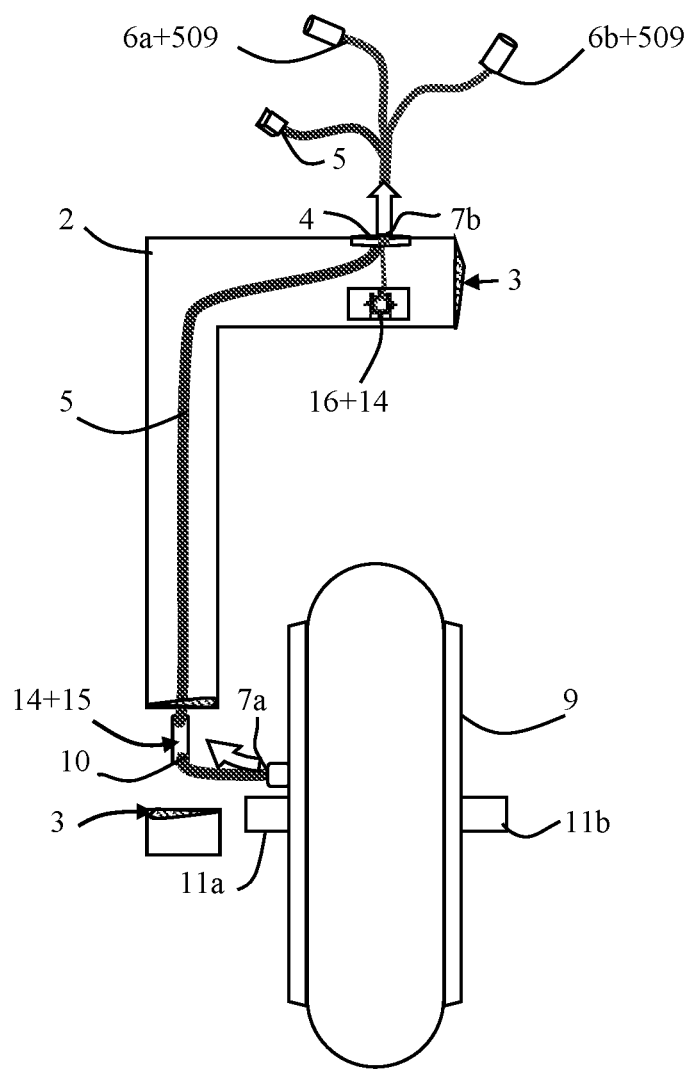
FIG. 4 shows a drive motor is comprising a lead cable harness, said lead cable harness to be contained within the yoke module.

As illustrated in the yoke module system 1 for the fabrication processes for yoke models numbered 102, 202, 301 and 302. The first connection process is detailed in FIG. 4, showing a cut through view wherein, the yoke module 2 can accommodate access via the yoke hollow conduit 3 (e.g., hollow space inside the yoke section). The yoke module 2 include access openings 4 which are respectively located on the yoke section. The yoke module 2 is constructed of plastic polymers or carbon fiber and another construction materials.

The yoke module's conduit 3 houses within an elongated USB power cable 5 having wiring connectors 6 to be threaded there through the yoke module's 2 hollow conduit 3 and thusly exits out the access openings 4 e.g., shown by arrows 7a and 7b. The yoke module system 1 is including a means for said USB power cable 5 to directly couple to a motorized wheel 8.

The motorized wheel's 8 further comprising a drive motor 9 and may include; a tire, a spindle or spokes, or the wheel is that of a motorized caster. The motorized wheel 8 comprises a single axis or dual axis supporting said drive motor 9. The drive motor 9 may be that of a hub motor or another motor type comprising a lead cable harness 10 and having one or two axle rods 11. The motorized wheel 8 connects to the drive motor axle 11 and respectively, said axle rod 11 is rotatably mounted on a hub assembly 12 by means of connecting to least one lug nut 13 via a connection process, and a bolting means 17 to connect onto a frame or supporting armature.

The hub assembly 12 comprising parts including lug nuts 13 can also utilize a coupling 14 and a connection process 15 (shown by arrows) for connecting the USB power cable 5 with the lead cable harness 10, and a bolting means 17 to connect onto a frame or supporting armature.

The yoke module's 6 coupling 14 and connection process 15 shown by arrow is for concealing both the yoke's USB power cable 5 and the drive motor lead cable harness 10 whereby the coupling point between both is situated inside the yoke module conduit space 3 as detailed in FIG. 4.

Figure 2A:
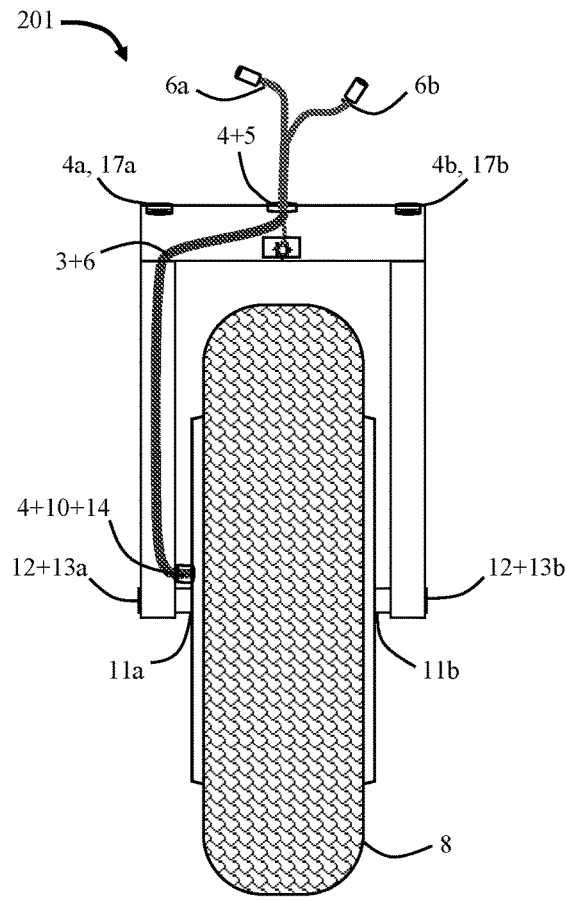
FIG. 2A shows a yoke module assembly of a cantilever member to accommodate one motorized wheel.

As shown in FIG. 2A the yoke module system is including a process to directly couple the yoke module 2 onto the drive motor's 9 axle rod 11, the hub assemblies include a connection process to affix the axle rod on the bottom of the yoke module 2.

As shown in FIG. 2A the USB power cable 5 comprises two wiring connection processes; a first connection method comprising one or more yoke module sections accommodating access for the USB power cable 5 and wire connectors 6 to be threaded through one or more access openings 4 and accordingly to exit out the top yoke module section.

In one aspect the motorized wheel 8 is connected to the drive motor by means of a fabrication process by the manufacturer and thereby, the yoke module is including a process means for accommodating access of said USB power cable 5 to be threaded through the top and the bottom sections of said yoke module and the lead cable harness to be contained within the yoke module as shown by arrows 7.

In another aspect a first connection process for wiring the hub motor to the USB cable 5 is comprising a prewired electrical wire harness threaded within the yoke's conduit via an opening aligned with the lead wire section of the hub motor 8 wherein, the lead cable harness 10 is wired directly to the USB power cable 5 this step can utilize the wire connector 6.

Figure 2B:
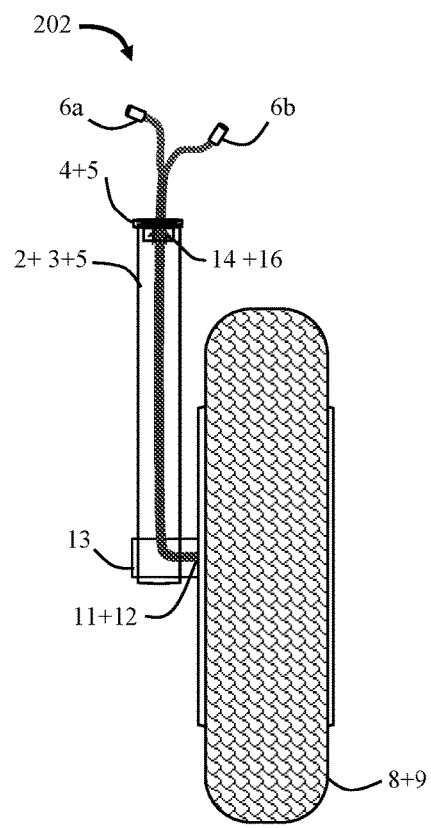
FIG. 2B shows a vertical yoke module assembly to accommodate one motorized wheel.

As FIG. 2B shows a yoke module comprising a cantilever shape 102 to accommodate one motorized wheel, the yoke module system for the yoke module 201 utilizes the first connection process for wiring the hub motor to the USB cable 5 and whereby is also comprising a prewired electrical wire harness threaded within the yoke's conduit 3 via an opening aligned with the lead wire harness 10 of the drive motor 9 wherein, the lead cable harness 10 is wired directly to the USB power cable 5 and by the wire connectors 6. The yoke module's conduit 3 assembly configured vertically, (shown) or configured to be angled laterally positioned fore and aft or at an angle, said yoke conduit comprising a means to connect onto a frame support being that of an appendage, an arm, a leg, a base or other supporting means.

As shown in FIG. 3A a dual yoke module comprising a fork shape 301 supporting a pair of synchronized motorized wheels. The dual wheels are configured with drive motors including the conduit connection process for wiring both the drive motors via the USB power cable 5. Wherein, the conduit is comprising a prewired electrical lead wire harness 10 threaded through the yoke's conduit 3 to connect to the via an access opening drive motors 9a, 9b wherein, the lead cable harness 10 is wired directly to the USB power cable 5 and to the wire connectors or plugs 6 and subsequently to the power source. In various aspects other yoke module subcombinations can be configured with different yoke shapes supporting one or more motorized hub wheels.

As shown in FIG. 3B a yoke module comprising a fork shape 302 of an inverted "T" shape comprising a sealed conduit 3 to house the hub assemblies therein and supporting a pair of synchronized motorized wheels. The wheels two drive motors are including the connection process for wiring the motors via the USB power cable 5. Wherein, the conduit is comprising a prewired electrical lead wire harness 10 threaded within the yoke's conduit 3 via an access opening in alignment with the drive motor 9 wherein, the lead cable harness 10 is wired directly to the USB power cable 5 and to the wire connectors or plugs 6. In other aspects other yoke module types may utilize one or more motorized wheels, in yet another aspect, the wheel may not comprise a traditional tire, an electric motor, plausibly the motor may be that of a pneumatically driven motor having lines, or a fueled motor having fuels line, or another motor type.

As shown in FIG. 3BB a yoke module 302 constructively configured with an inverted "T" configuration, the inverted "T" yoke module comprising a top section and a bottom section including an extra-wide axle comprising completely sealed conduit 3 for completely containing an elongated USB power cable and said bottom section also containing hub assemblies 12a,b and 13a, 13b, said hub assemblies supporting a pair of synchronized motorized wheels 8a.b, and 9a, 9b including regenerative braking means, not shown and USB power cable 5 connected with a monitoring sensor 14 configured with a section of the yoke module conduit 3.

In further detail FIG. 4 depicts a cut through view detailing a close up drawing of the yoke module assembly and showing the first connection process 15 for wiring the hub motor cable end to the USB cable end whereby the connection process begins with the yoke's conduit opening which is aligned with the hub motor 8 wherein, the lead cable harness 10 is wired directly to the USB power cable 5 and to the wiring plug in connectors 14, e.g., the connected cables are shown coupled by the coupling 14 and passing through the lower yoke section shown by arrow 7*a* to exit out through the top section of the yoke section 2 shown by arrow 7*b*. The connection process 15 shown by a black arrow connects the wire endings of said USB power cable and said lead cable harness together as illustrated. The access openings 4 allow the cables to be passed through the yoke sections. There is also access openings 4 on the yoke module 17 for subsequently bolting 17 an auxiliary contrivance 509 thereon, e.g., a second connection process using wire connectors 6*a* and 6*b*.

The fabrication process for the yoke module's 2 shown is FIG. 4 is achieved by the manufacturer thereby the design may include a prewired cable assembly for the cables 5 and 10. The yoke module, said yoke module comprising an elongated USB power cable which is completely contained within a hollow top section and a hollow bottom section of the yoke module, respectively the construction of said yoke sections are constructed with plastic, polymers, carbon fiber, metal, or a combination thereof to fully support the hub wheel and contrivances supporting the weight of the load attached thereon. The yoke module and contrivances can be fabricated from plastics, polymers, carbon fiber, metals, or that of another alloy assembly materials, wherein contrivances include; cable, wire, connections, plugs, couplings, bearings, nuts, and bolts 17 for fasteners, the fabrication process may also include a sensor 16 prewired and connected 14 within the yoke conduit 3.

As shown in FIG. 5 a systematic flowchart 500 detailing process steps 501-512 of the yoke module system 1 comprising the following processes:

501. The yoke module comprising one or more yoke sections and access openings allowing the USB power cable and lead cable harness to be threaded there through.
502. A connection method comprising a process to connect the drive motor's lead cable harness to the USB power cable by means of a wire connector.
503. The yoke module comprising a method to directly couple to the hub motor's axis rods via connection points slotted on the bottom ends of the yoke's forked members.
504. The drive motor comprising an axle rod journaled therein, said axle passing through and rotatably mounting to the wheel.
505. The axle rods comprising a process to be attached at a point between said axle rod and at the end opening of the fork section.
506. The yoke module comprising a means for providing electricity to drive a motor device via the first connection method respectively to connect the drive motor's lead cable harness to the USB power cable.
507. A fabrication process comprising a pre-wiring method to connect said USB power cable to one or more drive motors.
508. The yoke module including a fabrication process comprised of plastic, polymers, carbon fiber, metal, or a combination thereof
509. The yoke module system comprising a second connection method for the USB power cable to connect to an auxiliary contrivance.
510. The USB power cable to include a connection process for connecting sensors on a section of said yoke module.
511. The USB power cable to include a connection process for connecting to a controlled power source.
512. The USB power cable to include a connection process for connecting to a computer control system.

The yoke module system comprising a second connection process for the yoke module to subsequently connecting the elongated USB power cable and wiring connections to an auxiliary contrivance 509. In one or more embodiments the yoke is further comprising: one or more hollow arm sections, a yoke section comprising a means to bolt a top section of said yoke to a frame or to a platform; the yoke module system further comprising a forked yoke configuration, the forked yoke configuration including a right arm and a left arm; said right and left arm comprise a hollow conduit extending from the top section of the yoke down to the bottom section of said right and left arms; said yoke right and left arm configured having an access opening situated at the bottom section of said right and left arms; a connection method including a means to directly couple a hub motor axis rod via connection points slotted on the yoke's hollow bottom section; a connection method including a means to directly couple a hub motor with said USB power cable via said access opening situated at the bottom section of said right and left arms; a connection method provided by the forked yoke module USB power cable to connect to a fork module hub wheel motor via said access opening situated at the bottom section of said right and left arms. Respectively the yoke module system is comprising secondary methods for plugging into auxiliary components.

The yoke module may include a first and second adjustable shock absorber including a cylinder portion attached to the fork section and extendable disjointed rods mounted within said cylinder portions of the yoke module, and other sensors 16 for monitoring motion and stability status means, (not shown). Accordingly the yoke conduit assembly can be constructively configured to position vertically, laterally or a combination thereof and furthermore, comprise a means to couple onto an appendage, an arm, a leg, or jointed means.

Accordingly methodologies may include a process to subsequently connect to a computer device comprising a process system for controlling the hub wheel power thereby adjusting velocity and braking; a method to subsequently connect to a alternating power source, battery bank, or a battery pack; a prewired cable assembly and process method for connecting an AC electricity source to charge batteries; a prewired assembly and process for connecting to sensors respectively wired in and on a section of the yoke module and on the motorized hub wheel; a prewired assembly and process for connecting to a status monitoring system for communicating with internally wired sensors.

In one aspect the yoke module system auxiliary components are to furnish power managed by a method of control accordingly components include DC from a battery, a computer control system, and sensors 16 for motion control and status monitoring sensors 16, and ultimately the second connection method can be utilized a motion control system, and plug in via wire connection 6 to a gyroscopic balance sensor, a MEMS device, or another accelerometer type to monitor motion stability. The yoke module system is comprising at least one sensor; said sensor is contained inside a section of said yoke module; and said sensor is comprising a connection method to include USB power cable connecting a lead cable harness to said sensor; and also said sensor lead cable harness connecting to an auxiliary control system.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. A second connection method for the USB power cable to connect to a controlled power system including a battery with a charging device; a computer control system, and an array of sensor types including: sensors for motion control and status monitoring sensors, and a second connection method can be utilized a motion control system, and plug in via wire connection to a gyroscopic balance sensor, a MEMS device, or another accelerometer type to monitor motion stability. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The yoke module pre-wiring fabrication process is comprising a method to connect said USB power cable to one or more drive motors, said USB power cable is comprising a pre-wiring process to be completely enclosed within said yoke module, and comprising a pre-wiring process being threaded through a slotted access opening situated at the hollow bottom section, said USB power cable to be connected to said drive motor at said access opening. The yoke module's elongated USB power cable is completely contained within a hollow top section and a hollow bottom section including a fabrication process comprised of plastic, polymers, carbon fiber, metal, or a combination thereof. The yoke module system is comprising a second connection method for the USB power cable to connect to an auxiliary contrivance including at least that of: a second connection method for the USB power cable to connect to a controlled power system including a battery with a charging device; a computer control system, and an array of sensor types including: an array of sensors for motion control and also various drive logic and operation status monitoring sensors can be configured within the yoke sections, and a second connection method can be utilized a motion control system, and plug in via wire connection to a gyroscopic balance sensor, a MEMS device, or another accelerometer type to monitor motion stability.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The subject matter of the inventions includes all novel and nonobvious combinations and sub-combinations of the various elements, features, functions, and/or properties. The abstract of the disclosure is provided to allow the reader to quickly ascertain the nature of the technical disclosure. It is submitted with the understanding that it will not be use d to interpret or limit the scope or meaning of the claims. In addition, in the foregoing detailed description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the detailed description, with each claim standing on its own as a separately claimed subject matter.

I claim:

1. A yoke module system for powering a motorized wheel comprising:
    a yoke module comprising a contiguous conduit section which is pre-wired with USB power cable; the yoke further comprising one or more lateral arms, including arm ends coupled to one or more hub assemblies; and fabrication having multiple shapes with varied dimensions;
    a hub assembly comprising USB power cable contiguously contained within, and a coupling method for USB power cable to connect to at least one drive motor, more particularly a hub motor; and a coupling means for hub motors to be rotatably mounted on a least one hub assembly, and
    a first connection method for directly connecting the USB power cable and lead cable to yoke module sensors, sensors include; a gyroscopic balance sensor, a MEMS device, or another accelerometer type to monitor motion stability;
    a first connection method to directly connect USB power cable to a hub motor;
    a second connection method to directly connect a yoke module to auxiliary contrivances;
    the second connection method to directly connect a yoke module to a controlled power system.

2. The yoke module of claim 1 comprising one or more conduit sections; at least one section for allowing USB power cable to be threaded there through; and a bottom and top conduit sections for allowing a lead cable to be threaded there through.

3. The first connection method of claim 1, further comprising a connection means to directly connect the USB power cable to one or more hub motors by means of a wire connector contained within a hollow bottom section of yoke module.

4. The yoke module of claim 1 comprising a connection method to directly couple to the hub motor's axis rods via on connection points slotted on the hollow bottom ends of conduit sections of the yoke's module forked shaped members.

5. The hub motor of claim 1 comprising at least one an axis rod journaled therein, and a connection means for an axle rod to pass through and rotatably mount onto one or more hub wheel assemblies.

6. The axle rods of claim 1 comprising a process means to be attached at a point between an axle rod and at the end opening of the forked conduit section.

7. The yoke module of claim 1 further comprising a process means for providing electricity to power at least one hub motor, the process comprising a means to directly connect the hub motor's lead cable harness and to the USB power cable to an electricity means.

8. The fabrication process of claim 1, further comprising a contiguous pre-wiring process and means to connect USB power cable to one or more hub motors.

9. The yoke module contrivances of claim 1 including wherein, one or more hub motors, cable, wire connectors, plugs, couplings, bearings, nuts and bolts for fasteners, and a sensor prewired and connected within yoke conduit; and a fabrication process, wherein the conduit sections are comprised of plastic, polymers, carbon fiber, metal, or a combination thereof.

10. The first connection method of claim 1 comprising one or more contiguous conduit sections shaped vertical, horizontal or a combination thereof, thus accommodating access for the USB power cable and wire connectors to be threaded there through and to exit out the top access opening.

11. The second connection method of claim 1 to include a prewired connection means for a USB power cable connection to connect to sensors housed within a conduit section of a yoke module for motion stability.

12. The second connection method of claim 1 to include a connection means for a USB power cable via wire connectors to connect to a controlled auxiliary power source.

13. The second connection method of claim 1 to include a connection means for a USB power cable connection to connect to controlling auxiliary contrivances more specifically, vibration monitoring sensors and accelerometer motion sensors configured in the yoke module assemblies.

* * * * *